United States Patent
Park et al.

(10) Patent No.: US 7,856,251 B2
(45) Date of Patent: Dec. 21, 2010

(54) DEVICE AND METHOD FOR USING A ROTATING KEY AND CONTROLLING A DISPLAY IN A MOBILE TERMINAL

(75) Inventors: Jin-Woo Park, Gumi-si (KR); In-Kyu Choi, Daegu (KR); Seog-Geun Lee, Gumi-si (KR); Jong-Kerl Lee, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 223 days.

(21) Appl. No.: 10/831,203

(22) Filed: Apr. 26, 2004

(65) Prior Publication Data

US 2004/0214612 A1 Oct. 28, 2004

(30) Foreign Application Priority Data

Apr. 24, 2003 (KR) ...................... 10-2003-0025938
Jul. 25, 2003 (KR) ...................... 10-2003-0051597

(51) Int. Cl.
*H04M 1/00* (2006.01)
(52) U.S. Cl. .................. 455/566; 455/550.1; 455/556.2
(58) Field of Classification Search ................. 455/566, 455/550.1, 575.3, 575.4, 575.1, 56, 556.26
See application file for complete search history.

(56) References Cited

U.S. PATENT DOCUMENTS

| | | | | |
|---|---|---|---|---|
| 5,586,182 | A * | 12/1996 | Miyashita | 379/413 |
| 6,219,051 | B1 * | 4/2001 | Furuya | 715/785 |
| 6,249,689 | B1 * | 6/2001 | Aizawa | 455/566 |
| 6,512,497 | B1 * | 1/2003 | Kondo et al. | 345/1.1 |
| 6,593,914 | B1 * | 7/2003 | Nuovo et al. | 345/169 |
| 6,850,784 | B2 * | 2/2005 | SanGiovanni | 455/575.1 |
| 6,907,276 | B2 * | 6/2005 | Toba | 455/566 |
| 6,952,601 | B2 * | 10/2005 | Lieu et al. | 455/575.1 |
| 6,978,127 | B1 * | 12/2005 | Bulthuis et al. | 455/412.1 |
| 7,599,720 | B2 * | 10/2009 | Fujihara et al. | 455/575.1 |
| 2001/0011029 | A1 * | 8/2001 | Iwabuchi et al. | 455/566 |
| 2002/0037754 | A1 * | 3/2002 | Hama et al. | 455/566 |
| 2003/0044000 | A1 * | 3/2003 | Kfoury et al. | 379/433.04 |

(Continued)

FOREIGN PATENT DOCUMENTS

CN 1246230 A 3/2000

(Continued)

*Primary Examiner*—Ajit Patel
*Assistant Examiner*—Khai M Nguyen
(74) *Attorney, Agent, or Firm*—Roylance, Abrams, Berdo & Goodman, L.L.P.

(57) ABSTRACT

A device and method for using a rotating key on a mobile terminal is provided. The mobile terminal includes a plurality of dome switches which can detect a contact signal when pressed and a plurality of contact surfaces which can detect the position of the rotating key in each direction of rotation. The device and method comprises a folder opening/closing sensor for detecting whether a folder of the mobile terminal is opened or closed; first and second display sections for displaying menus or data according to the operation of the rotating key; and a control section for controlling the mobile terminal to display a menu or data selected by the operation of the rotating key on the first display section or the second display section according to an output from the folder opening/closing sensor.

5 Claims, 15 Drawing Sheets

U.S. PATENT DOCUMENTS

| | | | |
|---|---|---|---|
| 2003/0045245 A1* | 3/2003 | Hikishima | 455/90 |
| 2003/0153372 A1* | 8/2003 | Shimamura et al. | 455/575 |
| 2004/0080518 A1* | 4/2004 | Lee | 345/619 |
| 2004/0127267 A1* | 7/2004 | Wong et al. | 455/575.1 |
| 2004/0203532 A1* | 10/2004 | Mizuta | 455/90.3 |

FOREIGN PATENT DOCUMENTS

| | | |
|---|---|---|
| CN | 1404285 A | 3/2003 |
| CN | 1411253 A | 4/2003 |
| KR | 1020040089889 | 10/2004 |

\* cited by examiner

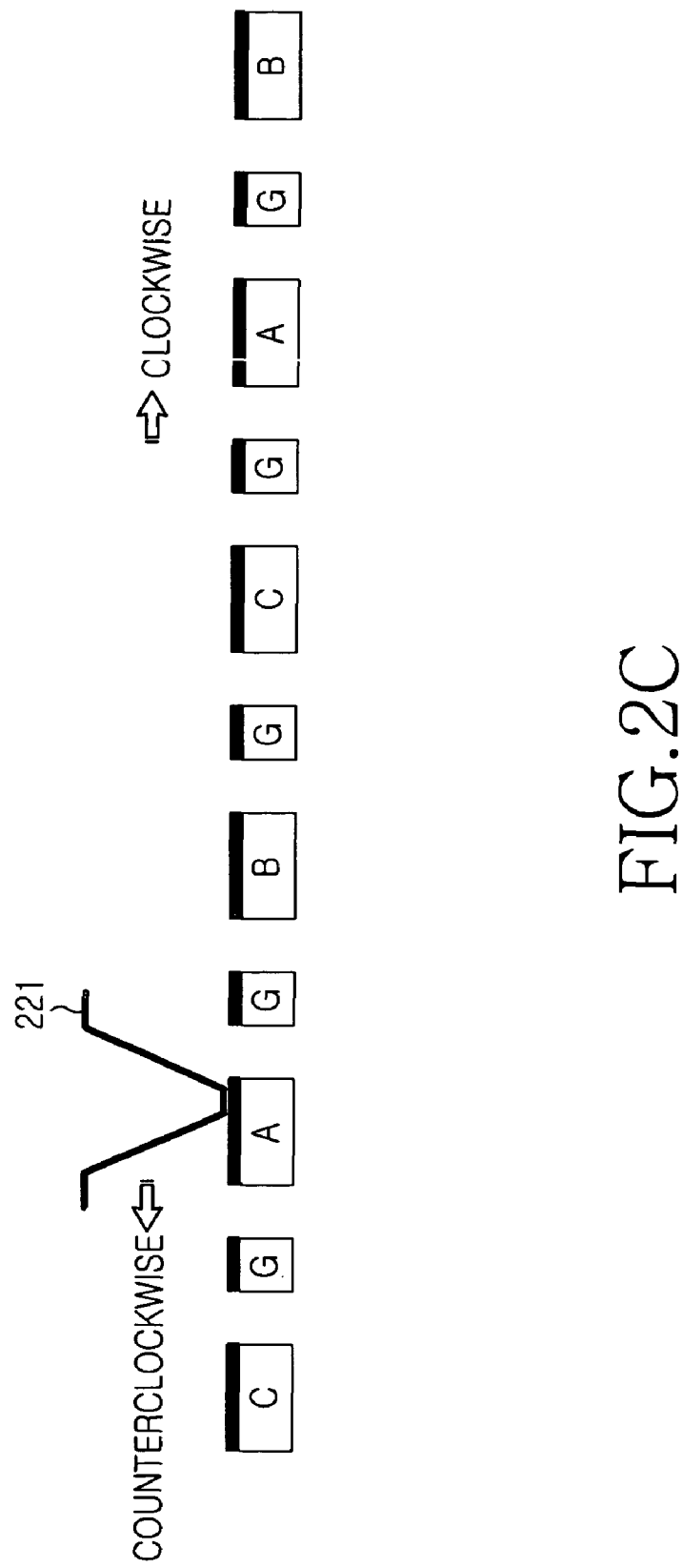

DEVICE AND METHOD FOR USING A ROTATING KEY AND CONTROLLING A DISPLAY IN A MOBILE TERMINAL

PRIORITY

This application claims priority under 35 U.S.C. §119(a) to an application entitled "Device and Method for Using Rotating Key in Mobile Terminal" filed with the Korean Intellectual Property Office on Apr. 24, 2003 and assigned Serial No. 2003-25938, and to another application entitled "Device and Method for Controlling Display in Mobile Terminal", filed in the Korean Intellectual Property Office on Jul. 25, 2003 and assigned Serial No. 2003-51597, the entire contents of which are incorporated herein by reference.

BACKGROUND OF THE INVENTION

1. Field of the Invention

The present invention relates to a mobile terminal having a rotating key. More particularly, the present invention relates to a device and a method for rapidly selecting a menu and an operation mode function using a rotating key provided on a mobile terminal when a folder of the mobile terminal is opened or closed and detecting the direction of the folder to terminate the power supplied to a display section of the mobile terminal.

2. Description of the Related Art

Mobile communication terminals are becoming more integrated than existing mobile telephones to perform high-speed data transmission in addition to voice communications. IMT-2000 mobile communication network services enable high-speed data transmission as well as voice communication through mobile terminals. In other words, mobile terminals can process both packet data and image data in an IMT-2000 network. Mobile terminals equipped with a camera or a TV receiver can also display moving pictures. A mobile terminal with an embedded camera can take pictures and display them as moving or still pictures. Also, it is possible to send the pictures to another mobile terminal.

A mobile terminal with a TV receiver can display received video or image signals. However, mobile terminals display pictures in a single fixed direction, regardless of the position of the terminals. Accordingly, viewers can see the pictures displayed only in a fixed direction on the mobile terminals. When a terminal is turned at a certain angle relative to the plane on which it stands, the resulting orientation of the displayed pictures does not match that of the pictures perceived by the viewer. As a solution to this problem, the mobile terminal can be provided with a sensor to detect the direction in which the folder of the mobile terminal is turned and display image signals according to the detected direction.

In a mobile terminal having a dual display unit, most functions are implemented through the keypad and the main display section, both of which can be used only when the folder of the mobile terminal is opened. Thus, the sub-display section is used only to implement a few simple functions when the folder is closed.

In a dual display unit which consists of a main display section and a sub-display section, image signals are displayed on the main display section according to the position and direction of the folder of the mobile terminal, while corresponding data is displayed on the sub-display section. When the user wishes to see only the image signals displayed on the main display section, the data display on the sub-display section causes unwanted power consumption.

The mobile terminal has a keypad with a plurality of keys used for inputting data, which typically include a send (SND) key, a cancel key, a clear (CLR) key, number/character keys, an end (END) key, function keys and a power (PWR) key. 15 to 20 keys are normally provided on the front side of a main housing of the mobile terminal to enable a user to input or select desired data by pressing of keys.

However, it is not easy for the user to find and press the proper keys to select and implement an operation mode function from a variety of menus. Also, the user has to rapidly move his or her fingers onto the keys to be pressed when trying to rapidly changing functions of the mobile terminal. Since it is difficult to rapidly select an operation mode function from a variety of menus, fast mobile Internet access cannot be achieved.

SUMMARY OF THE INVENTION

Accordingly, the present invention has been made to solve the above-mentioned problems occurring in the prior art and to provide other advantages, and one object of the present invention is to provide a device and a method for rapidly selecting a menu and an operation mode function using a rotating key provided on a mobile terminal when a folder of the mobile terminal is opened or closed.

Another object of the present invention is to provide a device and a method for detecting the direction in which a folder of a mobile terminal is turned and terminating the power supplied to a display section of the mobile terminal according to the detected direction.

In accordance with one aspect of the present invention for accomplishing the above objects, there is provided a device for using a rotating key on a mobile terminal. The rotating key includes a plurality of dome switches which can detect a contact signal when pressed and a plurality of contact surfaces which can detect the position of the rotating key in each direction of rotation. The device comprises a folder sensor for detecting whether a folder of the mobile terminal is opened or closed; first and second display sections for displaying menus or data according to the operation of the rotating key; and a control section for controlling the mobile terminal to display a menu or data selected by the operation of the rotating key on the first display section or the second display section according to an output from the folder sensor.

In accordance with another aspect of the present invention, a method for using a rotating key on a mobile terminal is provided. The rotating key includes a plurality of dome switches which can detect a contact signal when pressed and a plurality of contact surfaces which can detect the position of the rotating key in each direction of rotation. The method comprises detecting whether a folder of the mobile terminal is opened or closed. When detecting that the folder is opened, the method includes changing the current mode of the mobile terminal to a first mode and displaying a process performed by the operation of the rotating key on a first display section; and when detecting that the folder is closed, the method includes changing the current mode of the mobile terminal to a second mode and displaying a process performed by the operation of the rotating key on a second display section.

In accordance with still another aspect of the present invention, a method for using a rotating key on a mobile terminal is provided. The rotating key includes a plurality of dome switches which can detect a contact signal when pressed and a plurality of contact surfaces which can detect the position of the rotating key in each direction of rotation. The method comprises performing a call service in a second mode with a folder of the mobile terminal closed; and controlling a voice volume during the call according to the operation of the rotating key.

In accordance with still another aspect of the present invention, a method for using a rotating key on a mobile terminal is provided. The rotating key includes a plurality of dome switches which can detect a contact signal when pressed and a plurality of contact surfaces which can detect the position of the rotating key in each direction of rotation. The method comprises displaying menus on a second display section in a second mode with a folder of the mobile terminal closed; selecting a menu by operating the rotating key; and performing a function corresponding to the selected menu by operating the rotating key.

In order to accomplish the above objects of the present invention, a device for controlling a display unit of a mobile terminal, which comprises first and second display sections for displaying data is provided. The device comprises a direction detecting section for detecting the direction in which a folder of the mobile terminal is turned and generating one of first, second, third and fourth direction signals according to the detected direction; and a control section for outputting picture data on the first display section in a direction corresponding to a generated direction signal and terminating power supplied to the second display section.

In order to accomplish the above objects of the present invention, a method for controlling a display unit of a mobile terminal, which comprises first and second display sections for displaying data is provided. The method comprises detecting a direction signal generated according to the direction in which a folder of the mobile terminal is turned; displaying picture data on the first display section in a direction corresponding to the detected direction signal; and terminating power supplied to the second display section during the display of the picture data on the first display section.

BRIEF DESCRIPTION OF THE DRAWINGS

The above and other objects, features and advantages of the present invention will be more apparent from the following detailed description taken in conjunction with the accompanying drawings, in which:

FIGS. 2A through 2E are diagrams illustrating the structure of the rotating key of in FIG. 1;

In the drawings, the same element, although depicted in different drawings, will be designated by the same reference numeral or character.

DETAILED DESCRIPTION OF THE PREFERRED EMBODIMENTS

Embodiments of the present invention will be described with reference to the accompanying drawings. Throughout the following description, certain menus or functions selected according to the direction and speed of rotation of a rotating key and certain sensors for detecting the direction of a folder of a mobile terminal are used as examples. However, it should be obvious to those skilled in the art that the present invention can be modified or practiced with other menus or functions without departing from the scope of the present invention.

In the following description of the preferred embodiments of the invention, a mobile terminal equipped with a camera will be explained. However, the present invention is equally applicable to all general mobile terminals, including those having no built-in camera and those equipped with a TV receiver.

Figure 1:
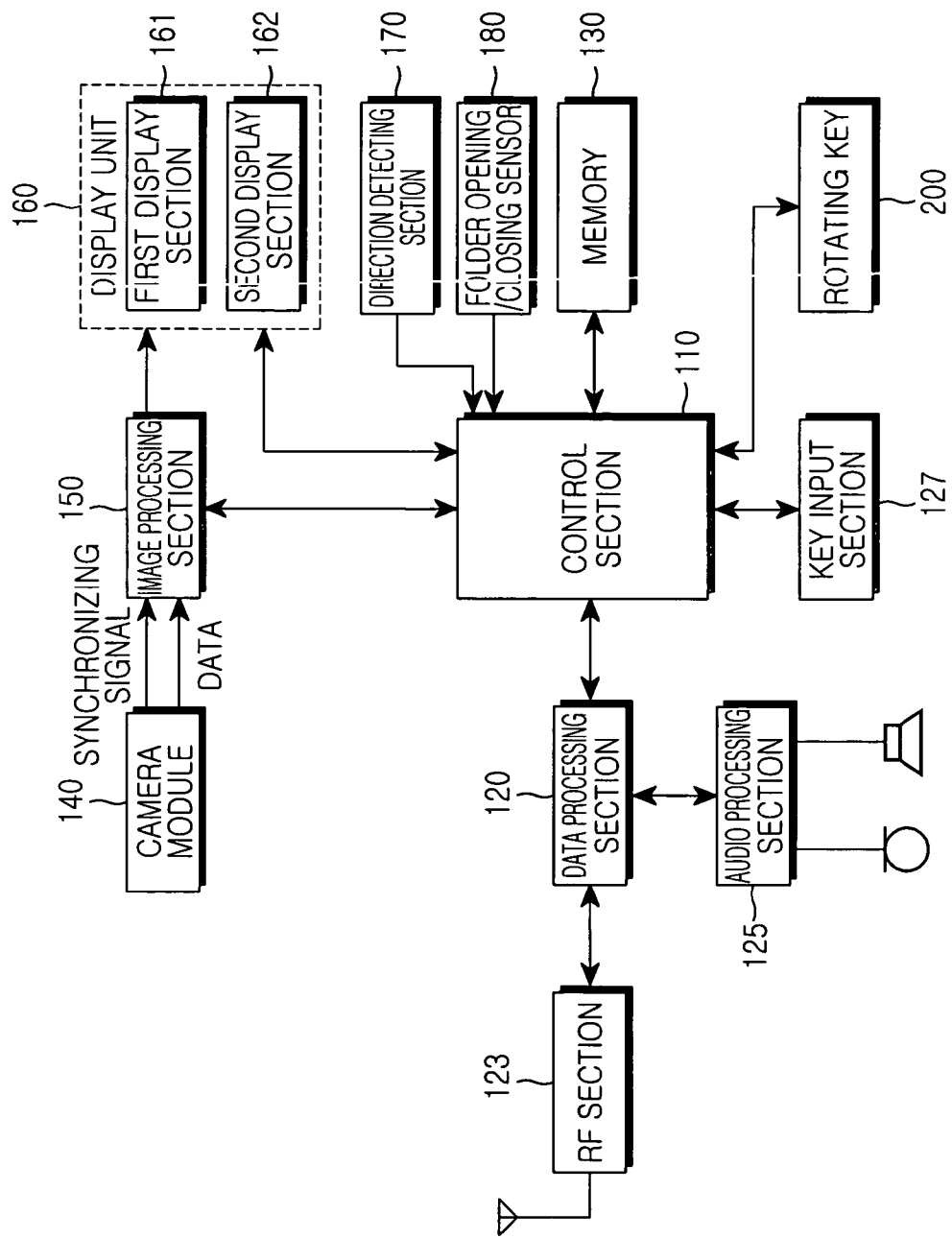
FIG. 1 is a block diagram illustrating a mobile terminal according to an embodiment of the present invention.

FIG. 1 is a block diagram illustrating a mobile terminal equipped with a camera according to an embodiment of the present invention. FIGS. 2A through 2E are diagrams illustrating a structure of the rotating key illustrated in FIG. 1. FIGS. 3A and 3B are diagrams illustrating a mobile terminal having the rotating key illustrated in FIGS. 2A through 2E.

Referring to FIGS. 1 to 3, an RF section 123 performs a wireless communication function of a mobile terminal. The RF section 123 comprises a RF transmitter (not shown) for performing upward conversion and amplification of the frequency of a signal, which is being transmitted, and an RF receiver (not shown) for amplifying a signal, which is being received, with low noise and performing downward conversion of the frequency of the signal. A data processing section 120 comprises a transmitter (not shown) for coding and modulating a signal which is being transmitted and a receiver (not shown) for demodulating and decoding a signal which is being received. The data processing section 120 may comprise a modem and a codec. The codec comprises a data codec for processing packet data and an audio codec for processing an audio signal such as a speech signal. An audio processing section 125 reproduces an audio signal output from the audio codec of the data processing section 120 or transmits an audio signal generated from a microphone to the audio codec of the data processing section 120.

A memory 130 may comprise a program memory and a data memory. The program memory includes programs for controlling general operations of the mobile terminal, programs for displaying a menu or data selected by the operation of the rotating key on a first display section 161 or a second display section 162 depending on whether the folder of the mobile terminal is opened or closed, and programs for terminating power supplied to the second display section 162 according to the state of the folder. The data memory temporarily stores data generated during implementation of the above programs.

A control section 110 controls the overall operations of the mobile terminal. The control section 110 may include the data processing section 120. The control section 110 displays a menu or data selected by the operation of the rotating key 200 on the first display section 161 or the second display section 162 according to a signal output from a folder opening/closing sensor 180. Also, the control section 110 detects the display direction of the mobile terminal according to a direction signal output from a direction detecting section 170 and displays a picture on the first display section 161 in an upright direction to the eyes of a user, while terminating the power supplied to the second display section 162.

A camera module 140 is used to take pictures of an object on which its lens focuses. The camera module 140 comprises a camera sensor for converting a photographed optical signal into an electric signal and a signal processor for converting an analog image signal photographed by the camera sensor into digital data. Assuming that the camera sensor is a charge coupled device (CCD) sensor, the signal processor can be a digital signal processor (DSP). The camera sensor and the signal processor can be either integrated into a single element or separated into independent elements.

An image processing section 150 generates picture data for displaying an image signal output from the camera module 140. The image processing section 150 processes image signals output from the camera module 140 in frames. Also, the image processing section 150 adjusts the frame image data to be compatible with the display unit 160, and in particular to features of the display such as the size and resolution, which are displayable on the display unit 160, and outputs the adjusted frame image data. The image processing section 150 comprises an image codec, and compresses the frame image data displayed on the display unit 160 in a preset manner or restore the compressed frame image data to the original frame image data. The image codec is selected from a variety of still or moving picture codecs, such as Joint Picture Experts Group (JPEG) codec, Moving Picture Experts Group 4 (MPEG4) codec or Wavelet codec, among others. The image processing section 150 has an on screen display (OSD) function. The image processing section 150 can output OSD data according to the displayed picture size under the control of the control section 110.

The display unit 160 displays image data output from the image processing section 150 or user data output from the control section 110. The display unit 160 can be a Liquid Crystal Display (LCD) comprising a LCD controller, a memory for storing image data and a LCD device. When the LCD is a touch screen, it can serve as an input section. The display unit 160 comprises the first display section 161 activated when the folder of the mobile terminal is open and apart from the main housing as shown in FIG. 3B and the second display section 162 activated when the folder is closed as shown in FIG. 3A. According to an embodiment of the present invention, the first display section 161 displays a menu, function or data selected by the operation of the rotating key 200 when the folder is opened. The second display section 162 displays a menu, function or data selected by the operation of the rotating key 200 when the folder is closed.

A key input section 127 is provided with keys for inputting numbers and characters and function keys for establishing various functions. The key input section 127 also includes a key for terminating the power supplied to the second display section 162 according to the embodiment of the present invention.

A direction detecting section 170 detects the direction in which the folder of the mobile terminal is turned and outputs a direction detecting signal to the control section 110. The direction detecting section 170 can be formed in a variety of structures.

A folder opening/closing sensor 180 detects whether the folder of the mobile terminal is opened or closed and outputs a signal corresponding to the detected state of the folder to the control section 110.

The rotating key 200 can be turned in a clockwise or counterclockwise manner, thereby enabling the user to rapidly select a menu or an operation mode function.

Figure 2A:
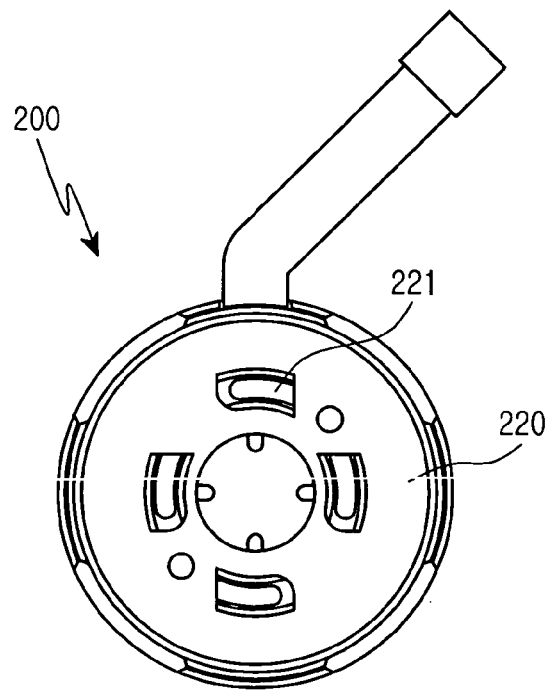
Figure 2B:
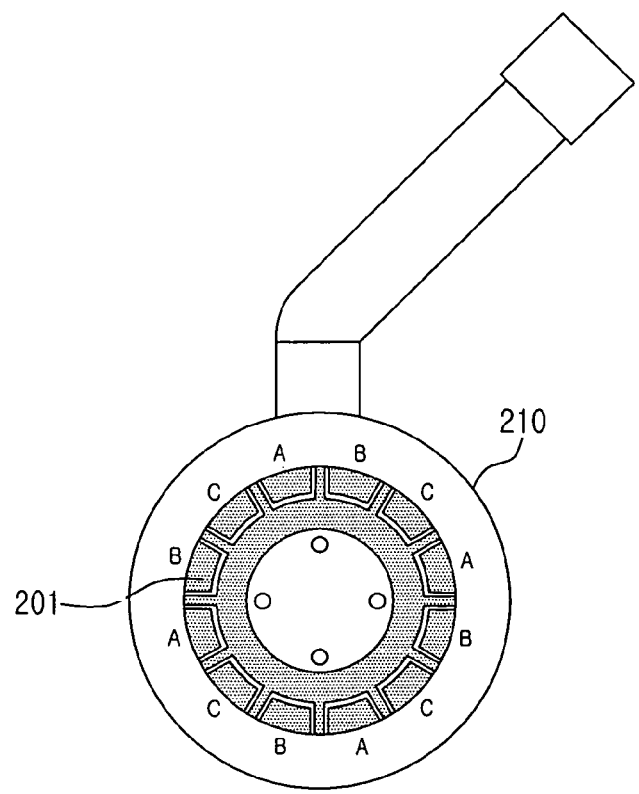
Figure 2D:
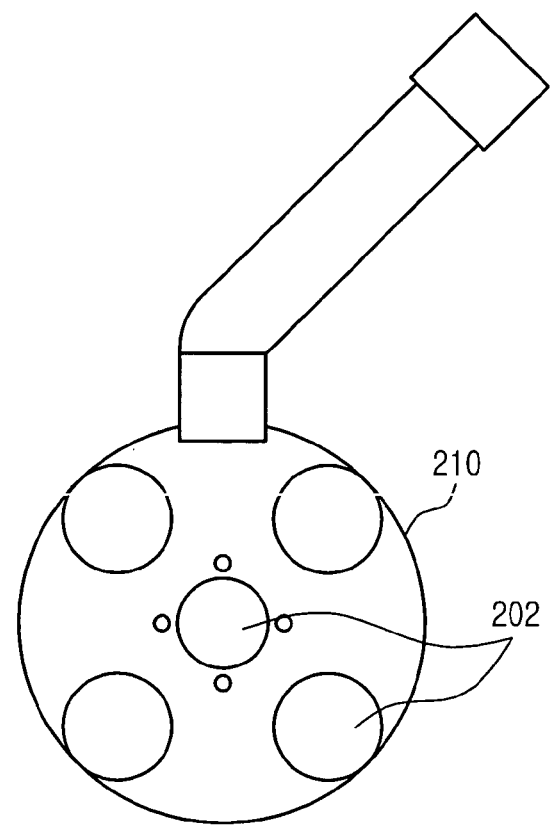
Figure 2E:
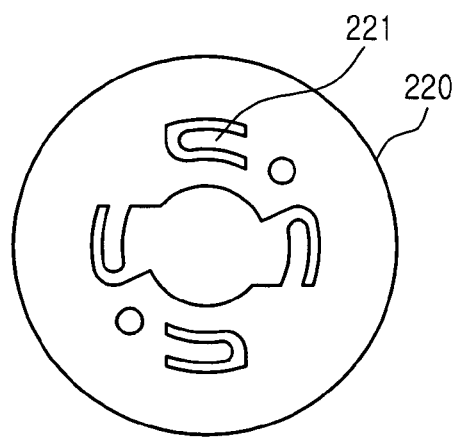
Figure 3A:
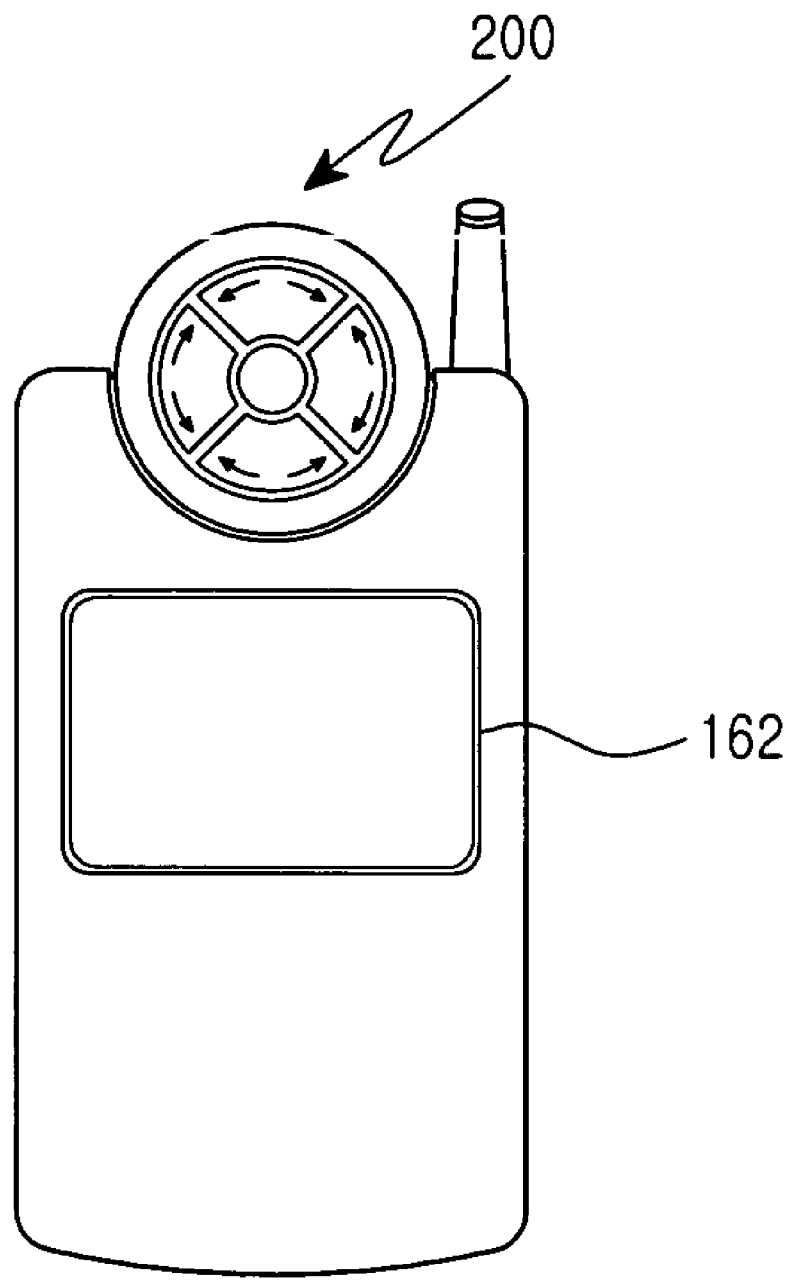
FIGS. 3A and 3B are diagrams illustrating a mobile terminal having a rotating key as illustrated in FIGS. 2A through 2E.
Figure 3B:
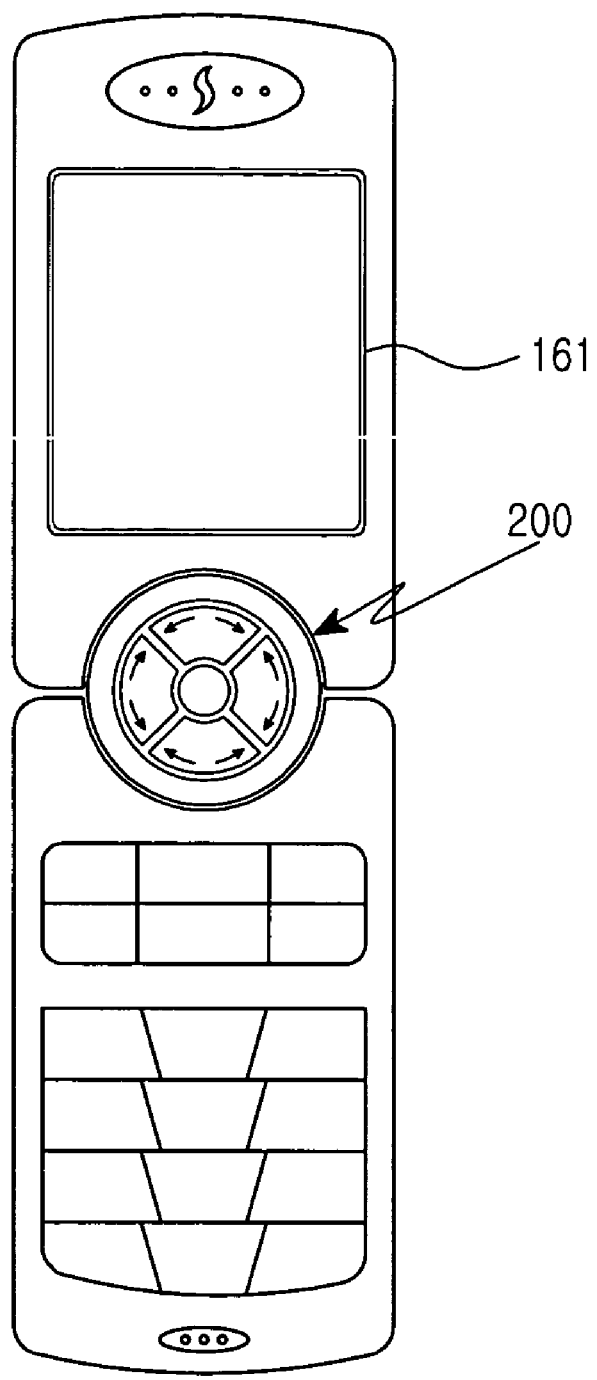

FIG. 2A shows the rotating key 200 as explained above. FIG. 2B is a plane view of a printed circuit board (PCB) of the rotating key, which has a plurality of contact surfaces. FIG. 2C is a cross-sectional structure of the PCB illustrated in FIG. 2B. FIG. 2D is a bottom view of the PCB having a plurality of dome switches. FIG. 2E shows a contact plate of the rotating key 200.

Referring to FIGS. 2A through 2E, the rotating key 200 includes a contact plate 220 having a contact terminal 221 and a PCB 210 for receiving an electrical signal upon contact with the contact terminal 221.

The PCB 210 comprises five dome switches on one side thereof as shown in FIG. 2D to detect a contact signal when pressed by the user and a plurality of contact surfaces 201 on the other side as shown in FIG. 2A to enable the contact terminal 221 to detect the position of the rotating key in each direction of rotation.

Assuming that the plurality of contact surfaces 201 are arrayed in repeated A-B-C sequence of positions clockwise as shown in FIGS. 2B and 2C, each port of the contact surfaces 201 will be in a "high" state if not connected to the contact terminal 221. Each port will become "low" immediately when connected to the contact terminal 221. In other words, when the user turns the rotating key 200 clockwise, the contact surfaces 201 become low in the sequence of A, B, C, A, B, C, . . . and so on. When the user turns the rotating key 200 counterclockwise, the contact surfaces 201 become low in the sequence of A, C, B, A, C, B, and so on. Thus, it is possible to detect whether the rotating key 200 is turned clockwise or counterclockwise. Each port of the contact surfaces 201 alternates between a long-term high state and a short-term low state while the rotating key 200 is turned. It is possible to know the turning speed of the rotating key 200 by measuring the cycle of such alternation. FIGS. 3A and 3B are diagrams illustrating a mobile terminal provided with the rotating key apparatus.

Figure 4:
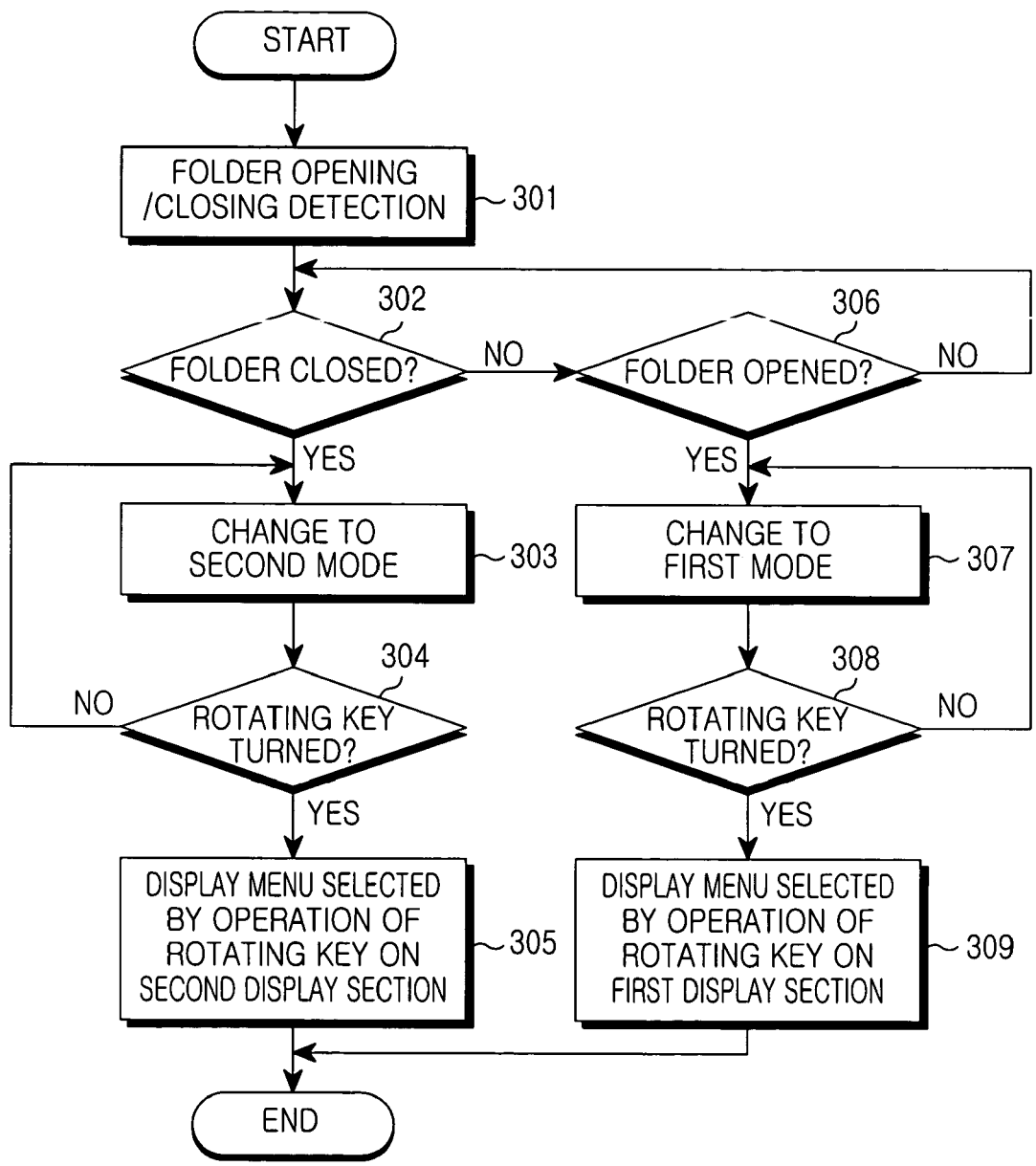
FIG. 4 is a flow chart illustrating a process of detecting the operation of a rotating key when a folder of a mobile terminal is opened or closed according to an embodiment of the present invention.

FIG. 4 is a flow chart illustrating a process of detecting the operation of the rotating key when the folder of the mobile terminal is opened or closed according to an embodiment of the present invention. Although this drawing shows a display according to the operation of the rotating key, it is possible to use the dome switches provided on the rotating key. In the preferred embodiments of the present invention, a first mode refers to an operation mode of the mobile terminal with its folder opened. Also, a second mode refers to an operation mode of the mobile terminal with its folder closed.

Hereinafter, the process of detecting the operation of the rotating key according to the present invention will be explained in more detail with reference to FIGS. 1 to 3.

At step 301, the folder opening/closing sensor 180 detects whether the folder of the mobile terminal is opened or closed and outputs a signal corresponding to the detected state of the folder to the control section 110.

When the folder is closed as shown in FIG. 3A, the control section 110 receives a corresponding signal from the folder opening/closing sensor 180 at step 302 and proceeds to step 303 to change the current mode of the mobile terminal to the second mode. When the user operates the rotating key 200 in the second mode at step 303, the control section 110 detects the operation at step 304 and proceeds to step 305 to display a menu selected or a function implemented by the operation of the rotating key 200 on the second display section 162. An example of such a menu or function will be explained in detail with reference to FIGS. 5 and 6.

When the folder is opened as shown in FIG. 3B, the control section 110 receives a corresponding signal from the folder opening/closing sensor 180 at step 306 and proceeds to step 307 to change the current mode of the mobile terminal to the first mode. When the user operates the rotating key 200 in the first mode at step 307, the control section 110 detects the operation at step 308 and proceeds to step 309 to display a menu selected or a function implemented by the operation of the rotating key 200 on the first display section 161. Such a menu or function will be explained in detail with reference to FIG. 7.

Figure 5:
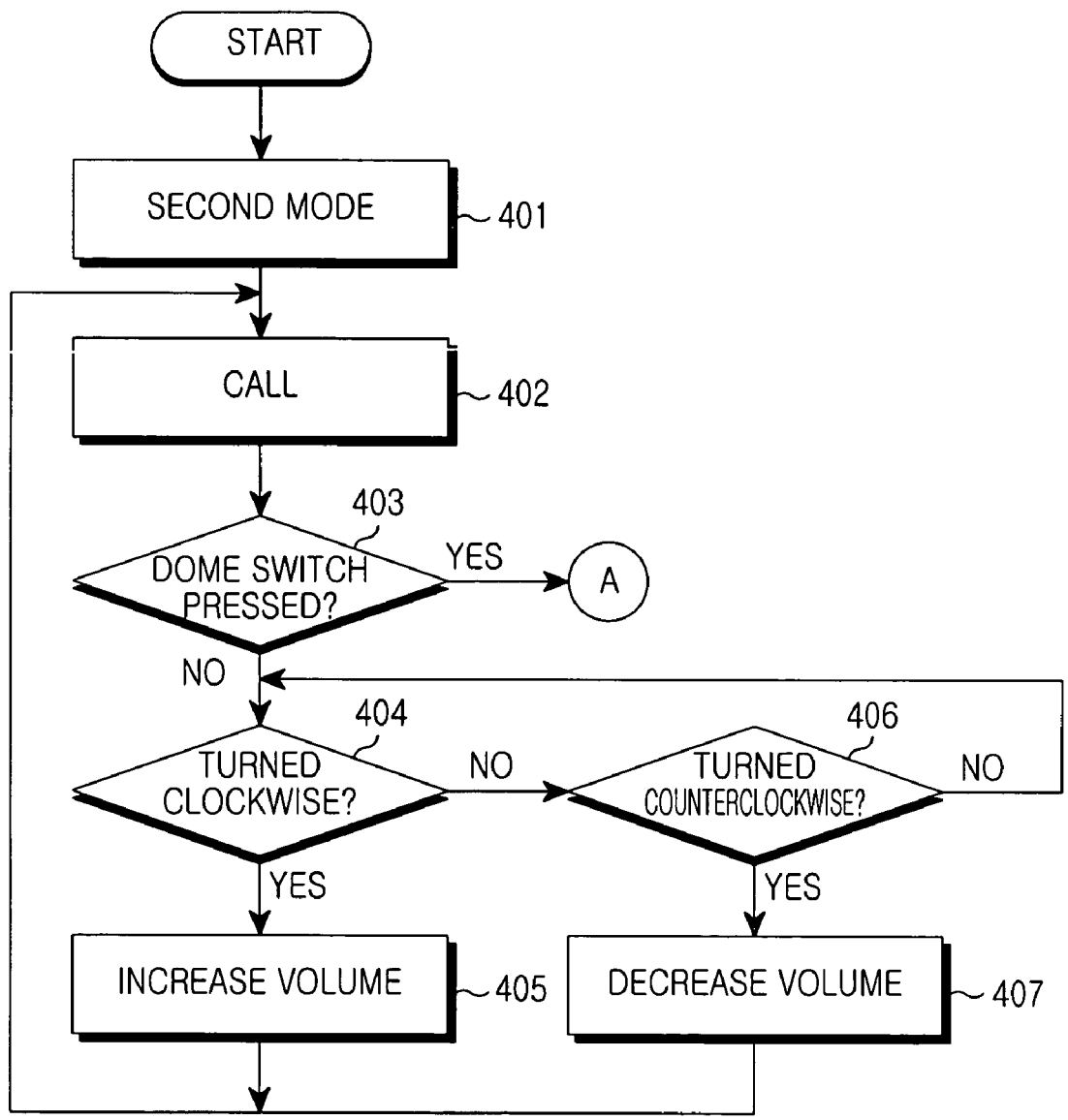
FIG. 5 is a flow chart illustrating a process of controlling the voice volume during a call in a second mode of a mobile terminal according to a first embodiment of the present invention.

FIG. 5 is a flow chart illustrating a process of controlling a voice volume during a call in the second mode of a mobile terminal according to the first embodiment of the present invention. Although this drawing shows a process of controlling the volume according to the direction of rotation of the rotating key, it is possible to control the volume using the dome switches formed on the rotating key.

Hereinafter, the first embodiment of the present invention will be explained in detail with reference to FIGS. 1 to 3A.

When the user receives an incoming call in the second mode as shown in FIG. 3A at step 401, the control section 110 detects the call mode at step 402. At step 403 a determination is made as to whether the dome switch was pressed. If the dome switch was not pressed, the process proceeds to step 404 where if the user turns the rotating key 200 clockwise during the call, the control section 110 will detect the clockwise turning and will increase the voice volume at step 405. If the user turns the rotating key 200 counterclockwise, the control section 110 will detect the counterclockwise turning at step 406 and will decrease the volume at step 407. However, it is also possible to decrease the volume during the call when the rotating key 200 is turned clockwise and increase the volume when the rotating key 200 is turned counterclockwise.

Figure 6:
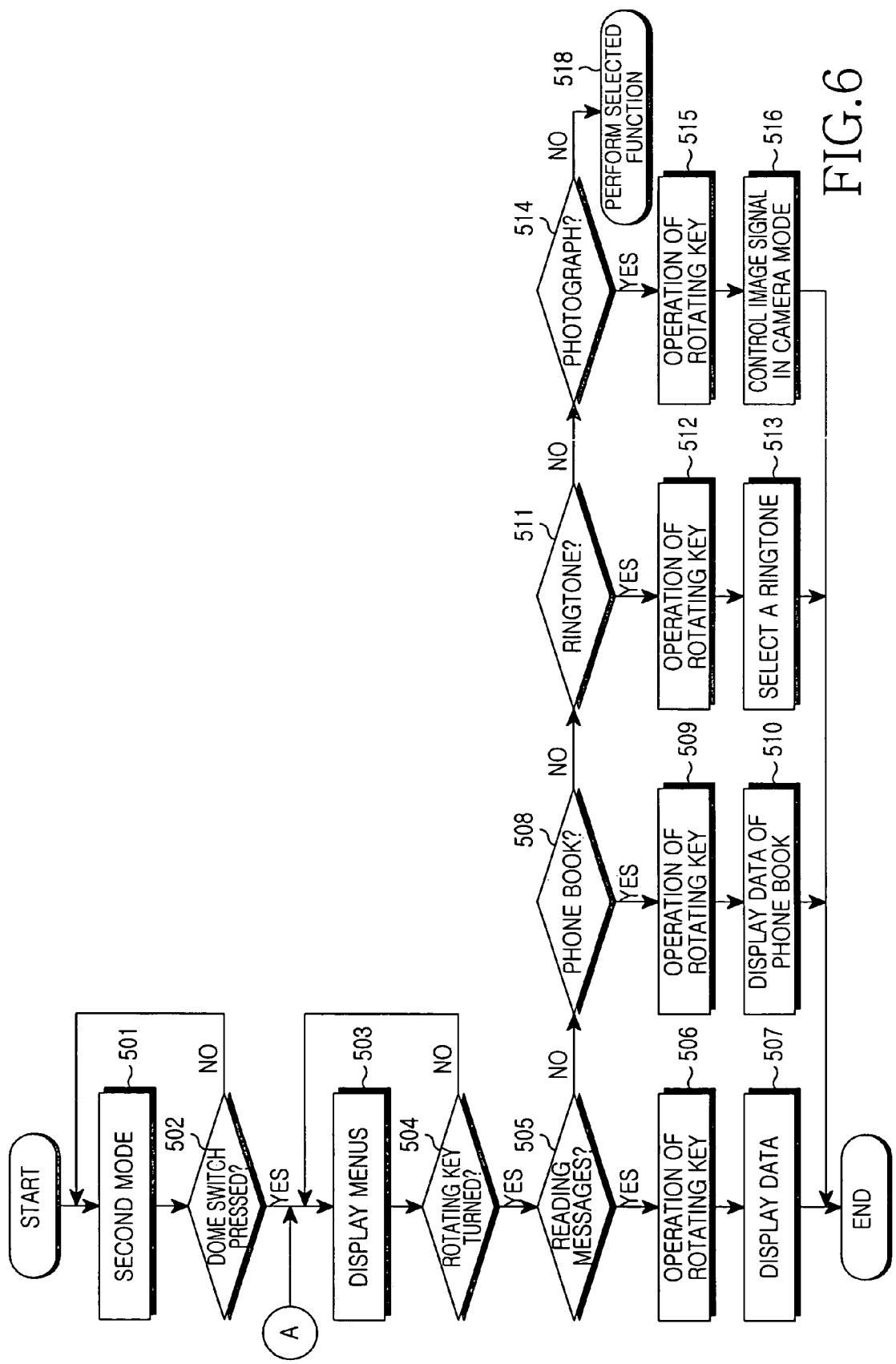
FIG. 6 is a flow chart illustrating a process of selecting a menu in a second mode of a mobile terminal according to a second embodiment of the present invention.

If the user presses a dome switch 202 provided on the rotating key 200 during the call at step 403, the control section 110 will proceed to step 503 to display menus as shown in FIG. 6. The user can press a side key provided on one side of the mobile terminal, instead of the dome switch 202.

FIG. 6 is a flow chart illustrating a process of selecting a menu in the second mode of a mobile terminal according to a second embodiment of the present invention. In the second embodiment, menus that can be displayed on the second display section, such as reading messages, phone book, ringtone selection and zoom or picture brightness control in camera mode, will be explained. Although FIG. 6 shows a process of selecting a menu using the rotating key, it is possible to use the dome switches formed on the rotating key.

Hereinafter, the second embodiment of the present invention will be explained in more detail with reference to FIGS. 1 to 3A.

When the user presses a dome switch 202 provided on the rotating key 200 in the second mode as shown in FIG. 3A at step 501, the control section detects the activation of the dome switch 202 at step 502 and proceeds to step 503 to display menus. The user can press a side key provided on one side of the mobile terminal, instead of the dome switch 202.

When the user operates the rotating key 200 during the display of menus at step 503, the control section 110 detects the operation at step 504 and moves a cursor on a menu to be selected according to the direction of rotation of the rotating key 200. If the rotating key 200 is turned clockwise in a mode of up/down scroll display of menus, the control section 110 will move the cursor to the upper menus. If the rotating key 200 is turned counterclockwise in the same display mode, the control section 100 will move the cursor to the lower menus. However, it is possible to move the cursor downward when the rotating key 200 is turned clockwise and upward when the rotating key 200 is turned counterclockwise. Also, if the rotating key 200 is turned clockwise in a mode of left/right scroll display of menus, the control section 100 will move the cursor to the left menus. If the rotating key 200 is turned counterclockwise in the left/right scroll display mode, the control section 100 will move the cursor to the right menus. However, it is possible to move the cursor right when the rotating key 200 is turned clockwise and left when the rotating key 200 is turned counterclockwise. If the user presses a dome switch 202 after placing the cursor on one of the menus displayed at step 503, the control section 110 will perform a function corresponding to the selected menu or display sub-menus.

If the user selects the "reading messages" menu, the control section 110 will detect the selection and display a received message on the second display section 162 at step 505. At this time, the most recently receive message can be displayed on the second display section 162. The user can see a whole list of received messages by scrolling down the displayed data using the rotating key 200. If the messages are stored by date in the order they were received, the user can scroll through the list of received messages in that order at step 507 by turning the rotating key at step 506. For example, if the rotating key 200 is turned clockwise, the messages will be displayed in descending order of received dates (newest to oldest). If the rotating key 200 is turned counterclockwise, the messages will be displayed in ascending order (oldest to newest). It is also possible to control the second display section 162 to display the messages in ascending order when the rotating key 200 is turned clockwise and in descending order when the rotating key 200 is turned counterclockwise.

If the user selects the "phone book" menu, the control section 110 will detect the selection and display data stored in the phone book on the second display section 162 at step 508. If the user turns the rotating key 200 at step 609 during the display of the data, the control section 110 will move the cursor through the displayed data according to the direction of rotation of the rotating key 200 at step 509. If the rotating key 200 is turned clockwise, the control section 110 will move the cursor to the data above. If the rotating key 200 is turned counterclockwise, the control section 110 will move the cursor to the data below. Alternatively, it is possible to move the cursor to the data below when the rotating key 200 is turned clockwise and to the data above when the rotating key 200 is turned counterclockwise. At step 510, the selected data is displayed.

If the user selects the "ringtone selection" menu, the control section will detect the selection and display available ringtones on the second display section 162 at step 511. If the user turns the rotating key 200 at step 512 during the display of the ringtones, the control section 110 will move the cursor through the displayed types of ringtones according to the direction of rotation of the rotating key 200 at step 513. If the ringtones are displayed in up/down scroll display mode, the control section 110 will move the cursor to the upper ringtones when the rotating key 200 is turned clockwise and to lower ringtones when the rotating key 200 is turned counterclockwise. Alternatively, it is possible to move the cursor downward when the rotating key 200 is turned clockwise and upward when the rotating key 200 is turned counterclockwise.

If the user selects the "photograph" menu, the control section 110 will detect the selection and proceeds to step 514 to change the current mode of the mobile terminal to a camera mode of displaying an image signal taken by the camera module 140. In the camera mode, the user can select a zoom function by pressing a dome switch 202 provided on the rotating key 200. If the user turns the rotating key 200 at step 515, the control section 110 will proceed to step 516 to perform a zoom-out function for gradually reducing the size of the image or a zoom-in function for gradually enlarging the image according to the direction of rotation of the rotating key 200. Also, the user can select a picture brightness control function by pressing a dome switch 202 provided on the rotating key 200. If the user turns the rotating key 200 at step 515, the control section 110 will proceed with step 516 to gradually increase or decrease the brightness of the picture according to the direction of rotation of the rotating key 200.

At step 518, other functions, such as reproduction, fast-forwarding and rewinding of a moving picture, ringtone volume control and ring/vibration selection, can be implemented using the rotating key 200 in the same manner as explained above.

Figure 7:
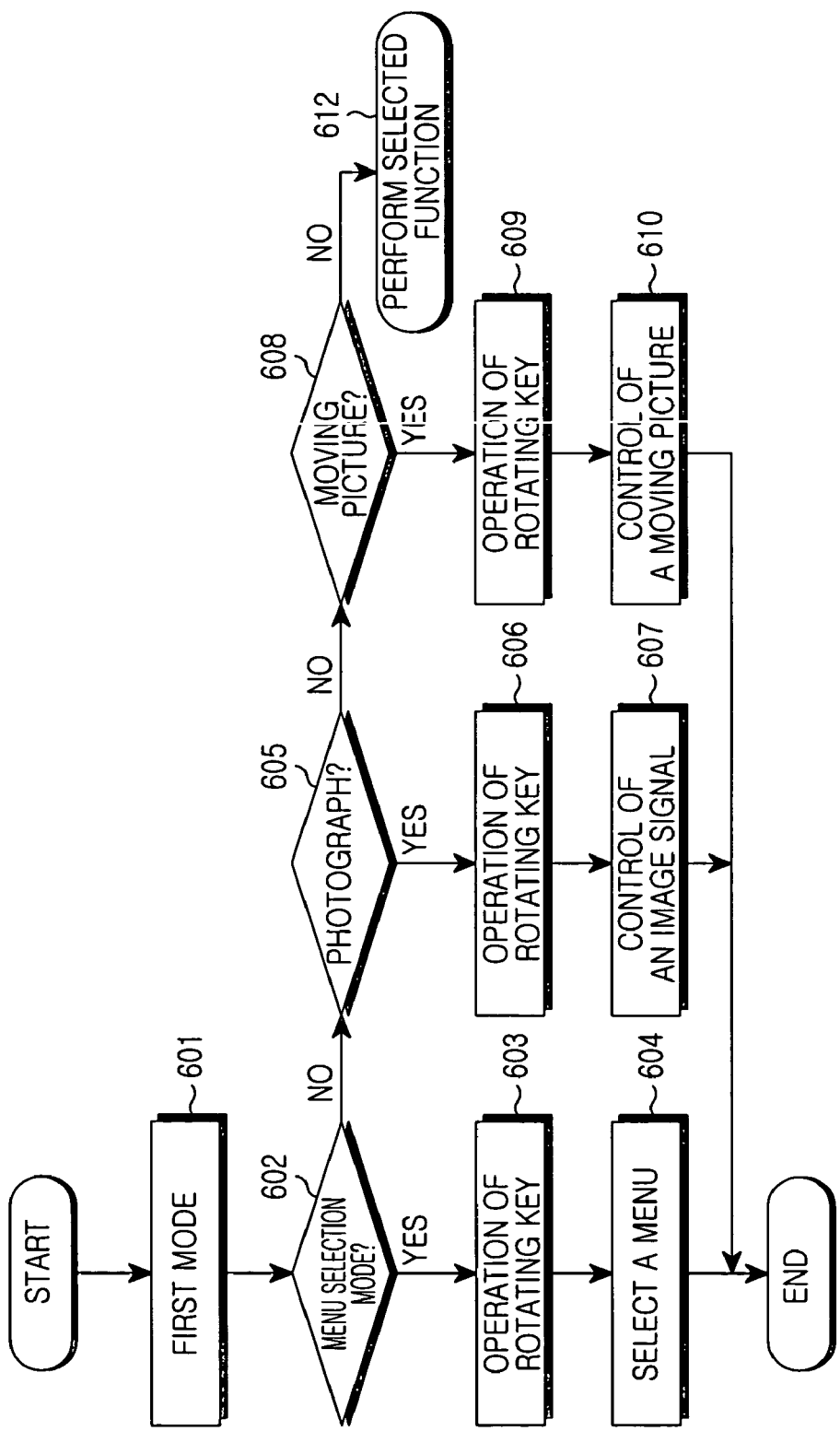
FIG. 7 is a flow chart illustrating a process of selecting a menu in a first mode of a mobile terminal according to a third embodiment of the present invention.

FIG. 7 is a flow chart illustrating a process of selecting a menu in the first mode of a mobile terminal according to a third embodiment of the present invention. In the third embodiment, selection of a menu and control of an image signal or a moving picture in camera mode will be explained. Although FIG. 7 show a process of selecting a menu or controlling an image signal or a moving picture using the rotating key 200, it is possible to use the dome switches provided on the rotating key for the same process.

Hereinafter, the third embodiment of the present invention will be explained in more detail with reference to FIGS. 1 to 3B.

When the mobile terminal is in a menu selection mode of displaying menus in the first mode as shown in FIG. 3B at step 601, the control section detects this mode and displays menus on the first display section 161 at step 602. The displayed menus include an initial menu, a text message or a phone book. If the user turns the rotating key 200 at step 603 during the display of the menus, the control section 110 will proceed to step 604 to move the cursor through the displayed menus according to the direction of rotation of the rotating key 200. If the first display section 161 is in up/down scroll display mode, the control section 110 will move the cursor to the upper (or lower) menus when the rotating key 200 is turned clockwise and to the lower (or upper) direction when the rotating key 200 is turned counterclockwise. If the first display section 161 is in left/right scroll display mode, the control section 110 will move the cursor to the left (or right) menus when the rotating key 200 is turned clockwise and to right (or left) menus when the rotating key 200 is turned counterclockwise.

If the mobile terminal is changed to the camera mode for displaying an image signal taken by the camera module 140 on the first display section 161 at step 601, the control section 110 will detect the change of mode at step 605. In the camera mode, the user can turn the rotating key 200 at step 606 in order to zoom in or out or to control the picture brightness at step 607.

If a moving picture is displayed at step 601, the control section 110 will detect the display of the moving picture at step 608. In the third embodiment, a moving picture is reproduced through the Internet or stored in the mobile terminal after being downloaded from the Internet or taken by a camcorder. If the user turns the rotating key 200 at step 609 during the display of the moving picture on the first display section 161, the control section 110 will proceed with step 610 to perform a fast-forward function or a rewind function according to the direction of rotation of the rotating key 200. At step 612 other selected functions are performed.

The rotating key 200 is also applicable to a mobile terminal equipped with a TV receiver. For example, the rotating key 200 can be used to select a channel when a TV broadcasting signal is received through the display unit. FIGS. 8A through 8E are diagrams illustrating directions in which a folder of a mobile terminal can be turned according to a fourth embodiment of the present invention. The direction detecting section 170 is used to detect the direction of the folder of the mobile terminal. In the fourth embodiment, it is assumed that the mobile terminal has four direction sensors in a main housing and one fixed magnet in a folder housing. The four sensors detect four directions in which the display unit 160 can be placed according to the detected pole (N pole or S pole) of the magnet. It is also assumed that the direction sensors used in the fourth embodiment are Hall sensors (Hall effect ICs). The positions and numbers of the sensors and the magnet may vary depending on the types of mobile terminals.

Referring to FIGS. 8A through 8E, the direction detecting section 170 comprises one magnet 850 fixed within the folder housing and four Hall sensors 811, 812, 821 and 822 mounted in the main housing to detect the polarity of the magnet 850 and generate a direction detecting signal. In the fourth embodiment as shown in FIGS. 8A through 8E, two Hall sensors 811 and 812 are used to detect the N pole of the magnet and mounted on the front side of the PCB of the main housing that contacts the folder housing of the mobile terminal. Also, the other two Hall sensors 821 and 822 are used to detect the S pole of the magnet and mounted on the rear side of the PCB of the main housing.

For explanatory convenience, it is assumed that the folders in FIGS. 8B through 8E are turned respectively in a first direction (turned 0° in an opened state), a fourth direction (turned 270° clockwise in an opened state), a second direction (turned 90° counter-clockwise in a closed state) and a third direction (turned 180° in an opened state).

Figure 8A:
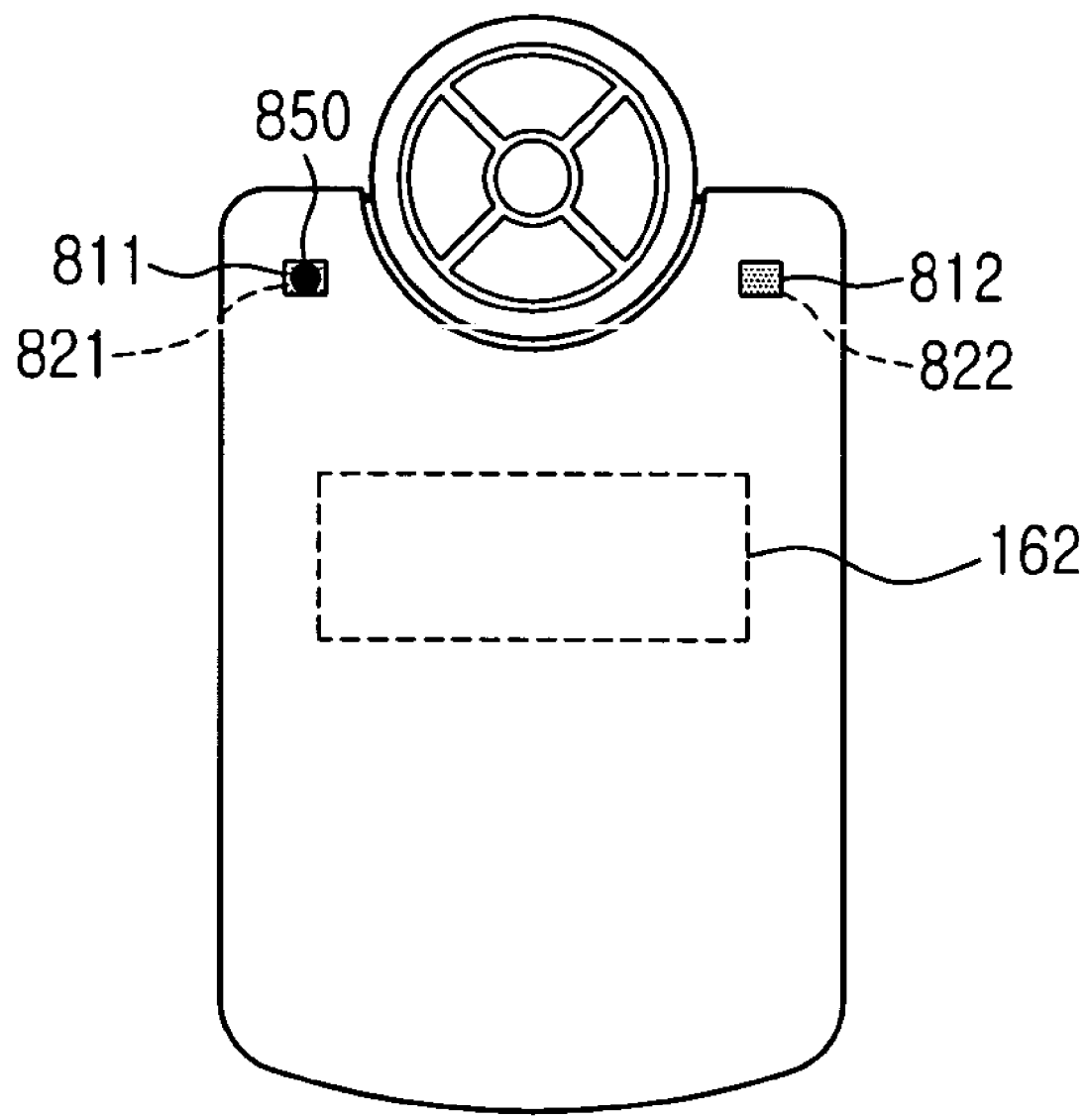
FIGS. 8A through 8E are diagrams illustrating directions in which a folder of a mobile terminal can be turned according to a fourth embodiment of the present invention.
Figure 8B:
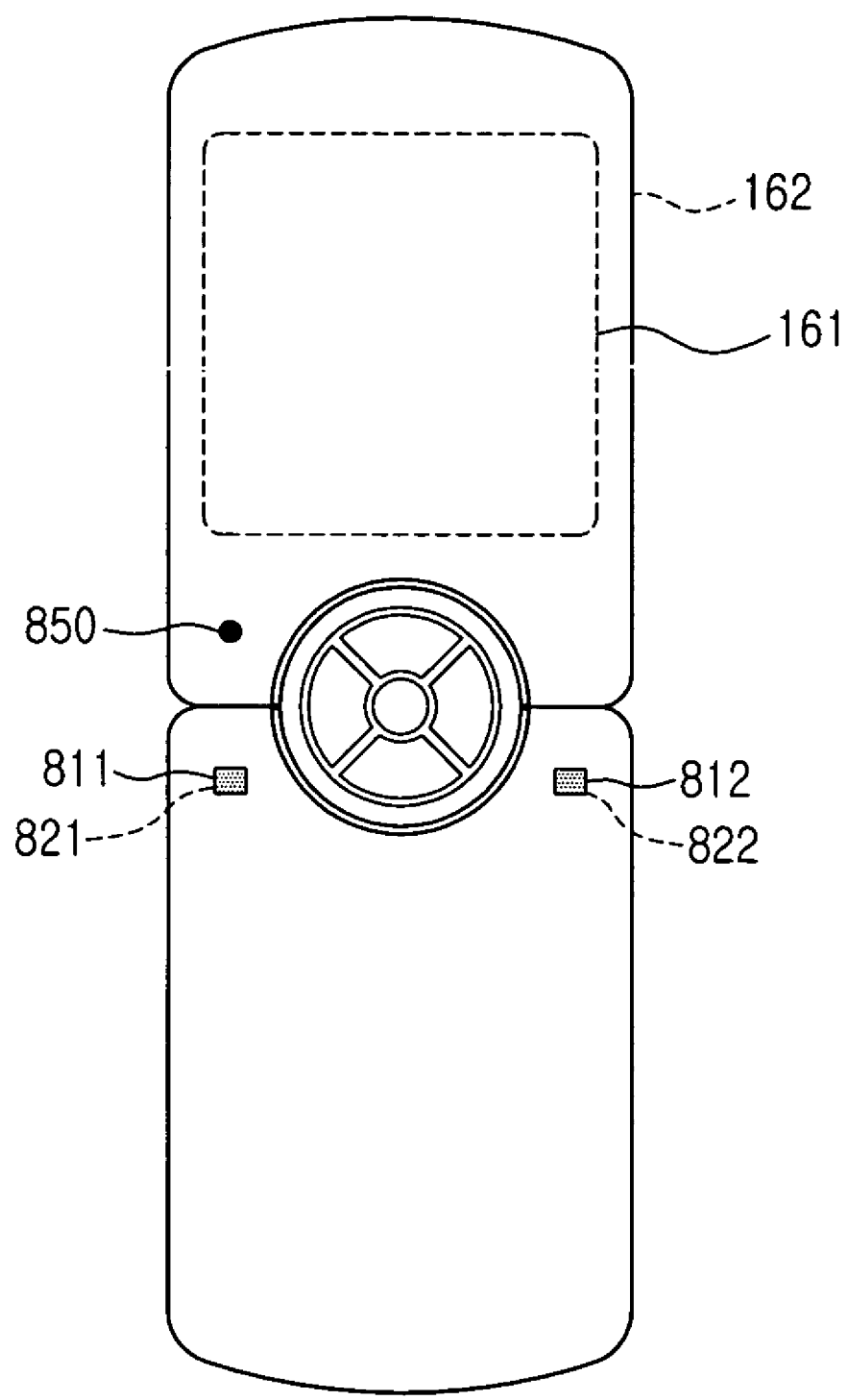
Figure 8C:
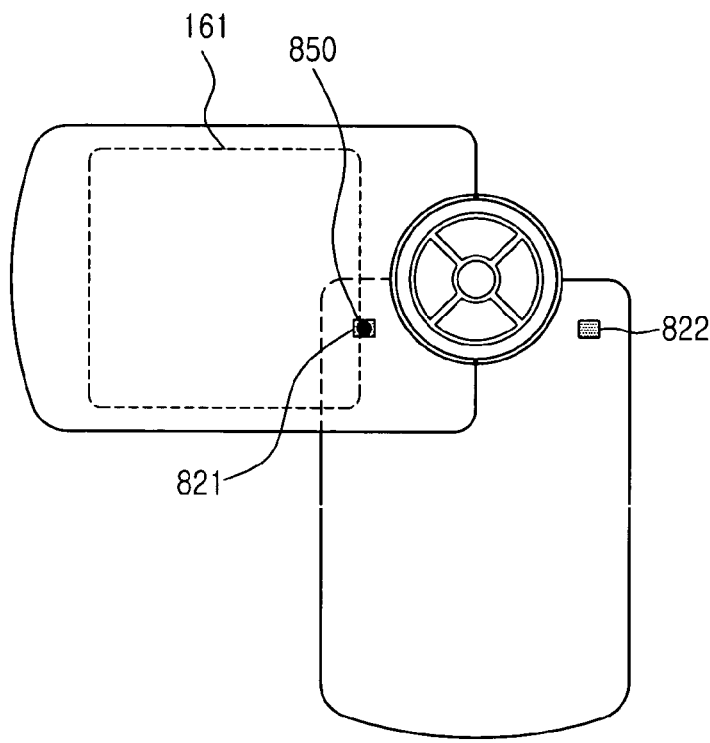
Figure 8D:
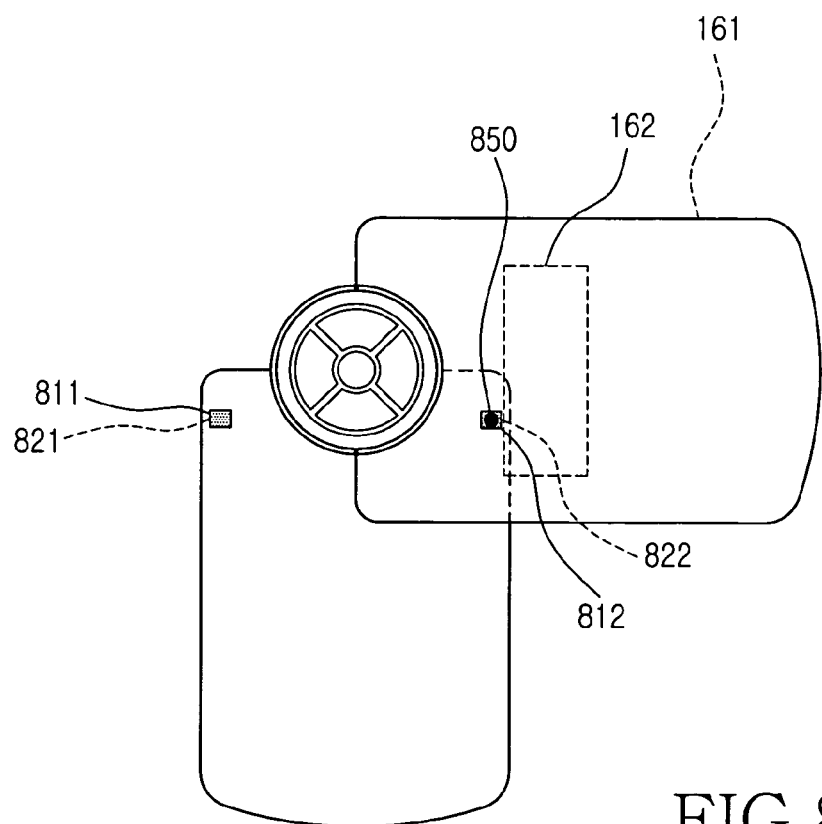
Figure 8E:
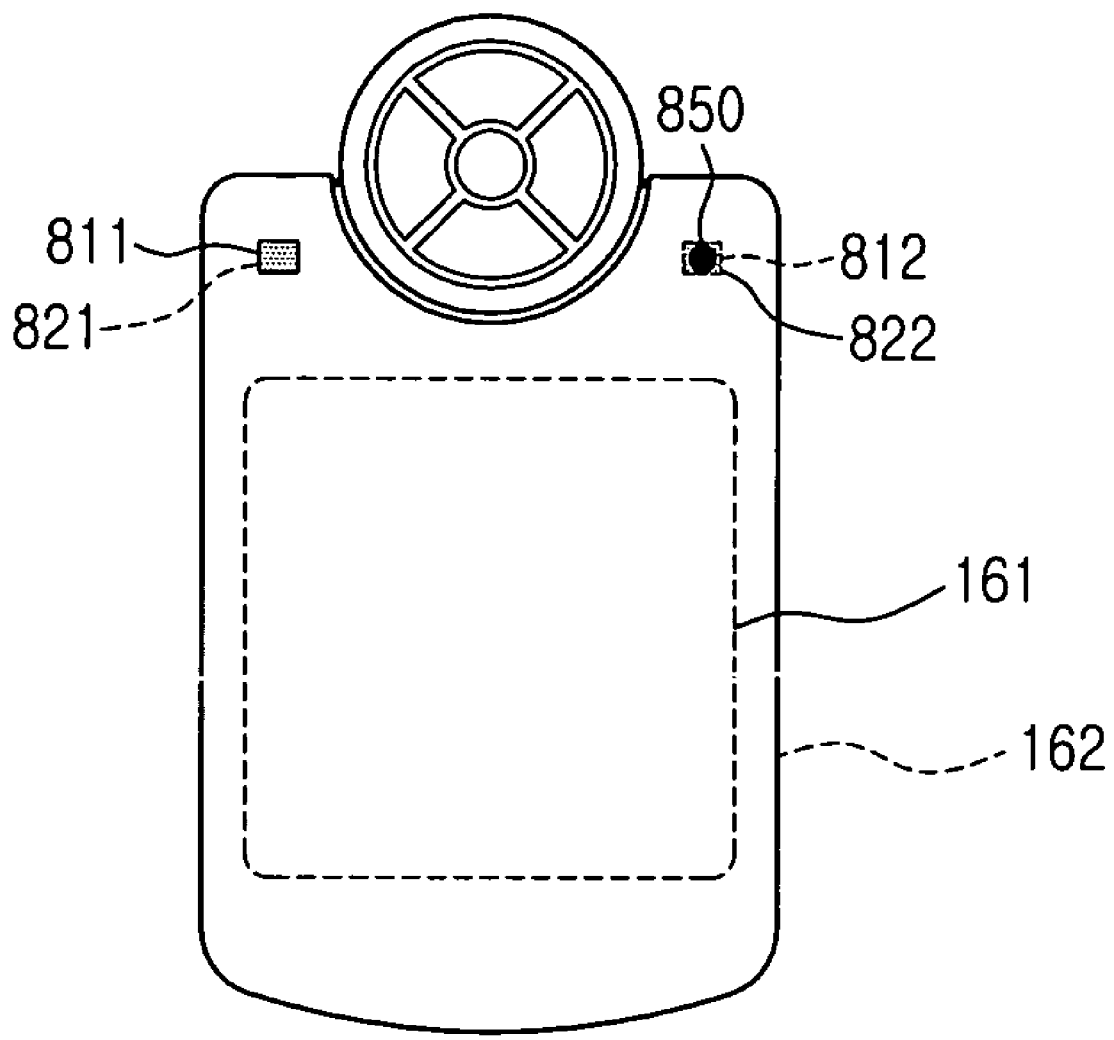

When the folder of the mobile terminal is closed as shown in FIG. 8A, the first Hall sensor 811 detects the N pole of the magnet 850. When the folder of the mobile terminal is opened as shown in FIG. 8B so that none of the four Hall sensors 811, 812, 821 and 822 can detect the polarity of the magnet 850, the direction detecting section 170 generates a first direction detecting signal. The first direction detecting signal is also generated when none of the Hall sensors 811, 812, 821 and 822 outputs a direction detecting signal. When the second Hall sensor 812 detects the N pole of the magnet 850 as shown in FIG. 8D, the direction detecting section 170 generates a second direction detecting signal. When the third Hall sensor 821 detects the S pole of the magnet 850 as shown in FIG. 8C, the direction detecting signal 170 generates a fourth direction detecting signal. Also, when the fourth Hall sensors 822 detects the S pole of the magnet 850 as shown in FIG. 8E, the direction detecting signal generates a third direction detecting signal.

The operation of a mobile terminal having the structure as shown in FIG. 1 will be explained in more detail with reference to FIG. 8. When the folder housing is opened to be apart from the main housing, the control section 110 controls the display unit 160 to be in the display mode. The "display mode" includes both a communication mode and a mode for displaying image signals taken by the camera module 140. In the display mode, the first to fourth Hall sensors 811, 812, 821 and 822 of the direction detecting section 170 detect the polarity (N pole or S pole) of the fixed magnet 850 according to the direction in which the folder of the mobile terminal is placed. The control section 110 reads the output from the direction detecting section 170 to determine the position and direction of the folder of the mobile terminal.

If no output from the Hall sensors 811, 812, 821 and 822 is detected, the control section 110 will determine that the folder of the mobile terminal is turned 0° and opened in a normal upright direction. If an output from the second Hall sensor 812 is detected, the control section 110 will determine that the folder of the mobile terminal is turned 90° counter-clockwise in a closed state. If an output from the third Hall sensor 821 is detected, the control section 110 will determine that the folder of the mobile terminal is turned 270° clockwise in an opened state. Also, if an output from the fourth Hall sensor 822 is detected, the control section 110 will determine that the folder of the mobile terminal is turned 180° upside down in an opened state. Then, the control section 110 will display picture data on the first display section 161, while terminating the power supplied to the second display section 162. The process of controlling the display unit 160 will be explained in detail with reference to FIG. 9.

Figure 9:
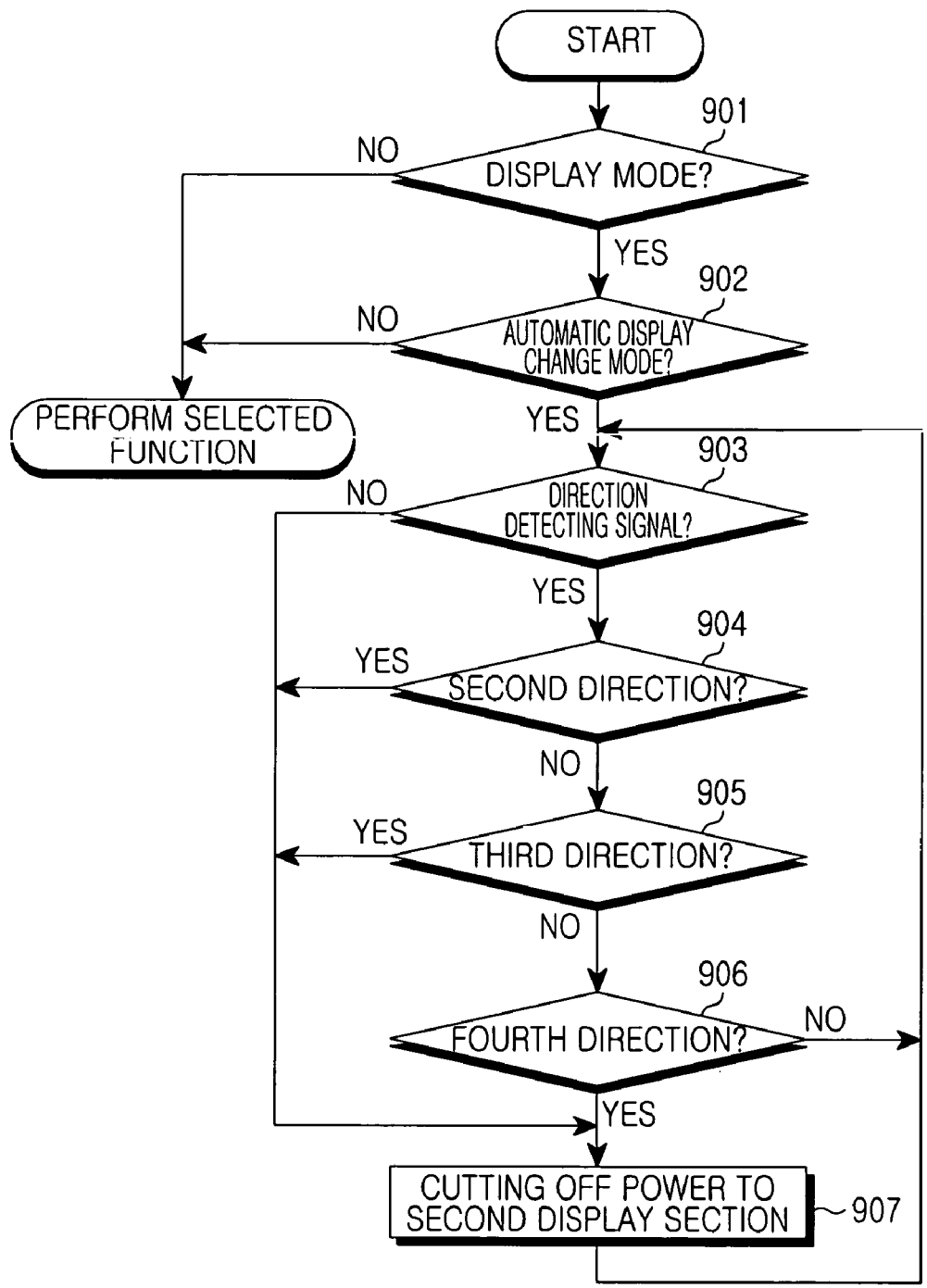
FIG. 9 is a flow chart illustrating a process of controlling a display unit of a mobile terminal according to the fourth embodiment of the present invention.

FIG. 9 is a flow chart illustrating a process of controlling a display unit of a mobile terminal according to the fourth embodiment of the present invention. The process of controlling the display unit 160 of a mobile terminal having the direction detecting section 170 as shown in FIGS. 8A through 8E will be explained in detail with reference to FIG. 9.

Referring to FIG. 9, the control section 110 determines whether the mobile terminal is in the display mode at step 901. The display mode refers to a mode of displaying a picture on the display unit 160 when the folder of the mobile terminal is opened to be apart from the main housing. Also, the control section 110 detects whether an automatic display change mode is set in the display mode at step 902. The automatic display change mode refers to a mode of automatically controlling the direction of a picture displayed on the display unit 160 according to a direction detecting signal output from the direction detecting section 170. If the automatic display change mode is not set, the control section 110 will display pictures only in a fixed direction (first direction, 0°), regardless of the output from the direction detecting section 170. If the automatic display change mode is set, the control section 110 will determine whether a direction detecting signal has been output from the direction detecting section 170.

When a direction detecting signal is output from the direction detecting section 170, the control section 110 detects the output and reads the output direction detecting signal at step 903. If no signal is output from the Hall sensors 811, 812, 821 and 822, the direction detecting section 170 will generate a first direction detecting signal at step 903. When the folder of the mobile terminal is closed as shown in FIG. 8A, the first Hall sensor 811 detects the N pole of the magnet 850. However, if the folder of the mobile terminal is opened so that none of the Hall sensors 811, 812, 821 and 822 can detect the polarity of the magnet 850, the direction detecting section 170 will generate the first direction detecting signal and the control section 110 will read the generated signal. When the first direction signal is generated, the control section 110 detect the signal at step 903 and proceeds to step 907 to terminate the power supplied to the second display section 162 after checking at steps 904, 905, and 906 for the second, third and fourth direction signals, respectively. At this time, the first display section 161 displays a picture in an upright direction. FIG. 8B shows a mobile terminal with its folder opened in the upright direction.

If the second Hall sensor 812 detects the N pole of the magnet 850, the direction detecting section 170 will generate a second direction detecting signal. Also, the control section 110 will read the generated second direction detecting signal. When the first direction signal is generated, the control section 110 detects the signal at step 904 and proceeds to step 907 to terminate the power supplied to the second display section 162. At this time, the first display section 161 displays a picture in a direction turned 90° counter-clockwise to be seen in the upright direction to the eyes of the viewer. FIG. 8D shows a mobile terminal with its folder turned 90° counter-clockwise in a closed state.

If the fourth Hall sensor 822 detects the S pole of the magnet 850, the direction detecting section 170 will generate a third direction detecting signal. Also, the control section 110 will read the generated third direction detecting signal. When the third direction detecting signal is generated, the control section 110 detects the signal at step 905 and proceeds to step 907 to terminate the power supplied to the second display section 162. At this time, the first display section 161 displays a picture in a direction turned 180° again to be seen in the upright direction to the eyes of the viewer. FIG. 8E shows a mobile terminal with its folder turned 180°.

If the third Hall sensor 821 detects the S pole of the magnet 850, the direction detecting section 170 will generate a fourth direction detecting signal. Also, the control section 110 will read the generated fourth direction detecting signal. When the fourth direction detecting signal is generated, the control section 110 detects the signal at step 906 and proceeds to step 907 to terminate the power supplied to the second display section 162. At this time, the first display section 161 displays a picture in a direction turned 270° counterclockwise to be seen in the upright direction to the eyes of the viewer. FIG. 8C shows a mobile terminal with its folder turned 270° clockwise.

It is possible to preset a menu or a key to terminate the power supplied to the second display section according to the direction and position of the folder of the mobile terminal. Also, it is possible to select the direction and position of the folder in which the power supplied to the second display area should be terminate. If the power cut-off for the second display section is not preset or cancelled, the second display area will be powered on to display data, regardless of the direction and position of the folder. Alternatively, the user can select a menu for terminating the power supplied to the second display section by pressing a preset key while data is displayed on the first display section. At this time, the user can also select the direction and position of the folder in which the power supplied to the second display section should be terminate.

Although embodiments of the present invention have been described for illustrative purposes, those skilled in the art will appreciate that various modifications, additions and substitutions are possible, without departing from the scope and spirit of the invention as disclosed in the accompanying claims, including the full scope of equivalents thereof. The mobile terminal having a rotating key according to embodiments of the present invention can detect whether its folder is opened or closed. The mobile terminal enables the user to rapidly select a menu or an operation mode function using the rotating key even when the folder is closed, thereby improving user convenience. According to embodiments of the present invention, it is possible to reduce power consumption by terminating the power supplied to the second display section according to the position of the folder.

What is claimed is:

1. A device for controlling a display unit of a mobile terminal, which comprises first and second display sections for displaying data, said device comprising:

a direction detecting section for detecting a direction in which a folder of the mobile terminal is turned and generating one of first, second, third and fourth direction signals according to the detected direction; and a control section for outputting picture data on the first display section in a direction corresponding to the generated direction signal automatically only if an automatic display change mode is set, and terminating power supplied to the second display section in response to the generated direction signal according to whether the detected direction is pre-selected to have the power terminated.

2. The device according to claim 1, wherein said first display section displays picture data in an upright direction when a first direction detecting signal is generated, in a direction turned 90° counter-clockwise when a second direction detecting signal is generated, in a direction turned 180° when a third direction detecting signal is generated, or in a direction turned 270° counter-clockwise when a fourth direction detecting signal is generated.

3. A method for controlling a display unit of a mobile terminal, which comprises first and second display sections, said method comprising the steps of:

detecting one of first, second, third and fourth direction signals generated according to a direction in which a folder of the mobile terminal is turned;

displaying picture data on the first display section in a direction corresponding to the detected direction signal automatically only if an automatic display change mode is set; and terminating power supplied to the second display section during the display of the picture data on the first display section in response to the detected direction signal according to whether the detected direction is pre-selected to have the power terminated.

4. The method according to claim 3, further comprising the step of: when the power cut-off for the second display section is cancelled, displaying corresponding data on the second display section while displaying the picture data on the first display section.

5. The method according to claim 3, wherein said step of displaying picture data on the first display section further comprising:

displaying picture data in an upright direction when a first direction detecting signal is generated, in a direction turned 90° counter-clockwise when a second direction detecting signal is generated, in a direction turned 180° when a third direction detecting signal is generated, or in a direction turned 270° counter-clockwise when a fourth direction detecting signal is generated.

* * * * *